(12) United States Patent
Slusher (10) Patent No.: US 9,010,020 B1
(45) Date of Patent: Apr. 21, 2015

(54) PLANT CONTAINER ASSEMBLY AND METHOD

(71) Applicant: Judith Ann Slusher, Harpers Ferry, WV (US)

(72) Inventor: Judith Ann Slusher, Harpers Ferry, WV (US)

( * ) Notice: Subject to any disclaimer, the term of this patent is extended or adjusted under 35 U.S.C. 154(b) by 0 days.

(21) Appl. No.: 14/120,927

(22) Filed: Jul. 10, 2014

(51) Int. Cl.
*A01G 9/02* (2006.01)
*A01G 9/00* (2006.01)

(52) U.S. Cl.
CPC ............ *A01G 9/02* (2013.01); *A01G 2009/003* (2013.01)

(58) Field of Classification Search
CPC ..... A01G 9/00; A01G 2009/003; A01G 9/02; A01G 9/026
USPC ............. 47/66.3, 66.4, 66.6, 66.7, 66.1, 66.2, 47/73, 86; 248/523
See application file for complete search history.

(56) References Cited

U.S. PATENT DOCUMENTS

| | | | |
|---|---|---|---|
| 404,585 A | 6/1889 | Wright | |
| 1,776,375 A * | 9/1930 | Russell | 47/73 |
| 2,219,690 A * | 10/1940 | Leydecker | 47/76 |
| 4,939,865 A | 7/1990 | Whitcomb et al. | |
| 5,331,908 A | 7/1994 | Loeb | |
| 5,359,809 A * | 11/1994 | Johnson | 47/73 |
| 6,904,715 B1 * | 6/2005 | Lawton | 47/66.3 |
| 7,770,323 B2 * | 8/2010 | Kim et al. | 47/66.3 |
| 2009/0025290 A1 | 1/2009 | Trabka | |
| 2009/0277084 A1 * | 11/2009 | Kempf | 47/66.3 |

* cited by examiner

*Primary Examiner* — William Gilbert
(74) *Attorney, Agent, or Firm* — Clifford D. Crowder (57) ABSTRACT

A plant container assembly, method, and kit include a plant container with a sidewall having first and second sidewall portions, an open top, and an open bottom. A hinge member is on the sidewall between the open top and the open bottom and pivotally connects the first and second sidewall portions for movement between an open position of the plant container, and a closed position of the plant container forming an interior space capable of containing plant growing medium. A closure portion extends along the sidewall between the open top and the open bottom. A plant support cooperatively engages the closure portion and selectively holds the plant container in the closed position. A planar member is configured to be selectively placed within the plant container and supported on a ledge member on each of the first and second sidewall portions to selectively form a bottom closure for the plant container.

15 Claims, 6 Drawing Sheets

Fig. 8 and more particularly, to a plant container assembly and method.

PLANT CONTAINER ASSEMBLY AND METHOD

TECHNICAL FIELD

The present disclosure relates to a plant container, and more particularly, to a plant container assembly and method.

BACKGROUND

Many people either enjoy growing and caring for plants, or they enjoy looking at them and admiring their beauty. Plants may be grown in a garden or landscaping environment, or they may be grown in containers. Some plants are held in a plant container, usually with some form of growing medium, until they can be transplanted into a more permanent location. Other plants remain in a plant container and are displayed in that manner. Plant containers come in various sizes and shapes, with most being of a size that is readily transportable by one person without any specialized equipment.

A common form of plant container has an open top, a slightly sloping sidewall, and a bottom. Its general form may be frusto-conical with a more or less circular top opening and a closed bottom. One or more drainage holes generally may be located at the bottom. For those situations where the plant container is a temporary vessel for a plant that is intended for planting in the ground, the plant container is often made of a nondescript plastic material. In other circumstances, for example where one wishes to display a plant along with its container, the container itself may be more ornate.

The usual procedure for removing a plant and its growing medium from a plant container for transplanting is to upend the container, and press gently on the bottom. As the plant and its growing medium are removed from the plant container, they may be carefully handled and planted in the ground. Sometimes, unfortunately, the plant and its growing medium may not release from the plant container as easily as it might seem. The result may be that the growing medium breaks away from the plant roots and damages the root system unduly. Commonly, once the plant container is emptied of its plant, it has served its purpose. The usual procedure is then to dispose of the plant container or simply store it for potential further use.

Some plants grow long stems that may require some form of support to prevent them from falling over. For example, some types of lilies grow tall and produce beautiful, but relatively heavy flowers atop the tall stems. Gravity alone may cause the plants to droop. Considering further the effect of wind and rain, this is a type of garden flower that may require a plant support in order to ensure that its beauty may be enjoyed to the fullest. Such plant supports are usually in the form of an elongated stake, rod, or wire that is pushed or driven into the ground, and the plant stem is often secured to the plant support by some form of flexible tie member.

In addition to the requirement that some plants be supported by one or more plant supports, it also may sometimes be desirable to protect the lower part of the plant from damage. For example, plants may require protection from mechanical damage, such as by lawn equipment or pets. Plants also may require protection from pests or from the elements. One solution commonly employed to help prevent mechanical damage is to enclose the plant by fencing material or by stones. Another solution to protect plants from sunscald or from insect or rodent damage is to provide some form of wrapping at the lower portion of the plant.

Gardens and landscape endeavors may be artistic displays that include more than plants. Accordingly, some gardeners also enjoy adding decorations of various types to their plantings. These may appear, for example, in the form of various ornaments placed adjacent and/or dispersed among the plants. The result may be a garden assemblage of living plants and inanimate objects of art or decoration.

It would be both beneficial and desirable for a plant container itself to serve some function other than merely to transport the plant to its garden location. For example, it would be of great benefit if the plant container could serve the additional purpose of protecting the plant as it is growing. It also would be desirable to have a plant container that is more reliably removable from the plant and growing medium contained within it with decreased risk of damaging plant roots. Further, it would be a benefit if the plant container could in some way help maintain plant supports employed for those plants which may need to be supported. In addition, it would be advantageous if the plant container could serve an ornamental purpose.

A plant container that also may be used to protect seedlings after they are planted is disclosed in U.S. Pat. No. 404,585 to Wright ("the Wright patent"). The Wright patent discloses a container that is nearly cylindrical, but slightly smaller at its bottom than at its top. The container is made of paper, and its bottom is formed by folding over the paper at the lower edge. The edges of the paper used to make the container are held together by wire staples. When a small plant in the container is to be transplanted, the bottom of the container is unfolded and the container and plant are placed in the ground. With the bottom wire staple removed, the container may then be slid up over the root mass and used to protect the stem of the plant. The plant container of the Wright patent is intended to be thrown away after use.

While the plant container of the Wright patent may facilitate transplanting of small plants and serve to protect young seedlings after they are transplanted, it may have only limited value in a garden or landscape environment. For example, the container of the Wright patent, since it is disclosed as made of paper, obviously would be limited to use with small seedlings. In addition, it is not readily apparent that the container could reliably be pulled up over the plant after planting without tearing since growing medium and root mass may have adhered to the inside surface of the container. Furthermore, the Wright patent does not disclose any way to use plant supports in cooperation with the plant container. Moreover, the intent disclosed in the Wright patent is to throw away the plant container after use, and the Wright patent does not contemplate any auxiliary decorative use of the container.

The disclosed plant container assembly and method include improvements in known plant container assemblies and methods of the character described.

SUMMARY

In one aspect, a plant container includes a sidewall with at least first and second sidewall portions, an open top, an open bottom, and at least one hinge member on the sidewall. The hinge member permits pivotal movement of the first sidewall portion relative to the second sidewall portion between an open position of the plant container, and a closed position of the plant container forming an interior space capable of containing plant growing medium. A closure portion extends along the sidewall between the open top and the open bottom.

In another aspect, a plant container assembly includes a sidewall with first and second sidewall portions, an open top, an open bottom, and a hinge member extending along the sidewall between the open top and the open bottom and pivotally connecting the first and second sidewall portions for movement between an open position of the plant container, and a closed position of the plant container forming an interior space capable of containing plant growing medium. A closure portion extends along the sidewall between the open top and the open bottom. A plant support cooperatively engages the closure portion and selectively holds the plant container in the closed position.

In another aspect, a method for selectively containing and protecting plants includes providing a plant container with an open top and an open bottom and having sidewall portions hinged to each other along a hinge extending between the open top and open bottom. The side wall portions are secured to each other along a line extending between the open top and open bottom by a releasable fastener. The method also includes placing growing medium and a plant within the plant container. The method also includes releasing the fastener and pivoting the side wall portions about the hinge to open the plant container. The method additionally includes removing the plant container from the growing medium and plant. The method further includes placing the plant container on the ground and around a planted and growing plant. The method also includes pivoting the side wall portions about the hinge and securing the side wall portions to each other by the releasable fastener along the line extending between the open top and open bottom.

In a further aspect, a kit for gardening and landscaping includes at least one plant container with a sidewall having first and second sidewall portions, an open top, an open bottom, and a hinge member extending along the sidewall between the open top and the open bottom and pivotally connecting the first and second sidewall portions for movement between an open position of the plant container, and a closed position of the plant container forming an interior space capable of containing plant growing medium. The at least one plant container also includes a closure portion extending along the sidewall between the open top and the open bottom and including a first plurality of eyelets on the first sidewall portion and a second plurality of eyelets on the second sidewall portion. The at least one plant container also includes a ledge member on each of the first and second sidewall portions. The kit also includes at least one elongated plant support configured to extend through the first and second plurality of eyelets of the at least one plant container and having a length greater than the distance between the open top and the open bottom of the at least one plant container. The kit further includes a planar member with at least one aperture through the planar member and at least one notch at an edge of the planar member. The planar member is configured to rest on the ledge members on each of the first and second sidewall portions.

DETAILED DESCRIPTION

Figure 1:
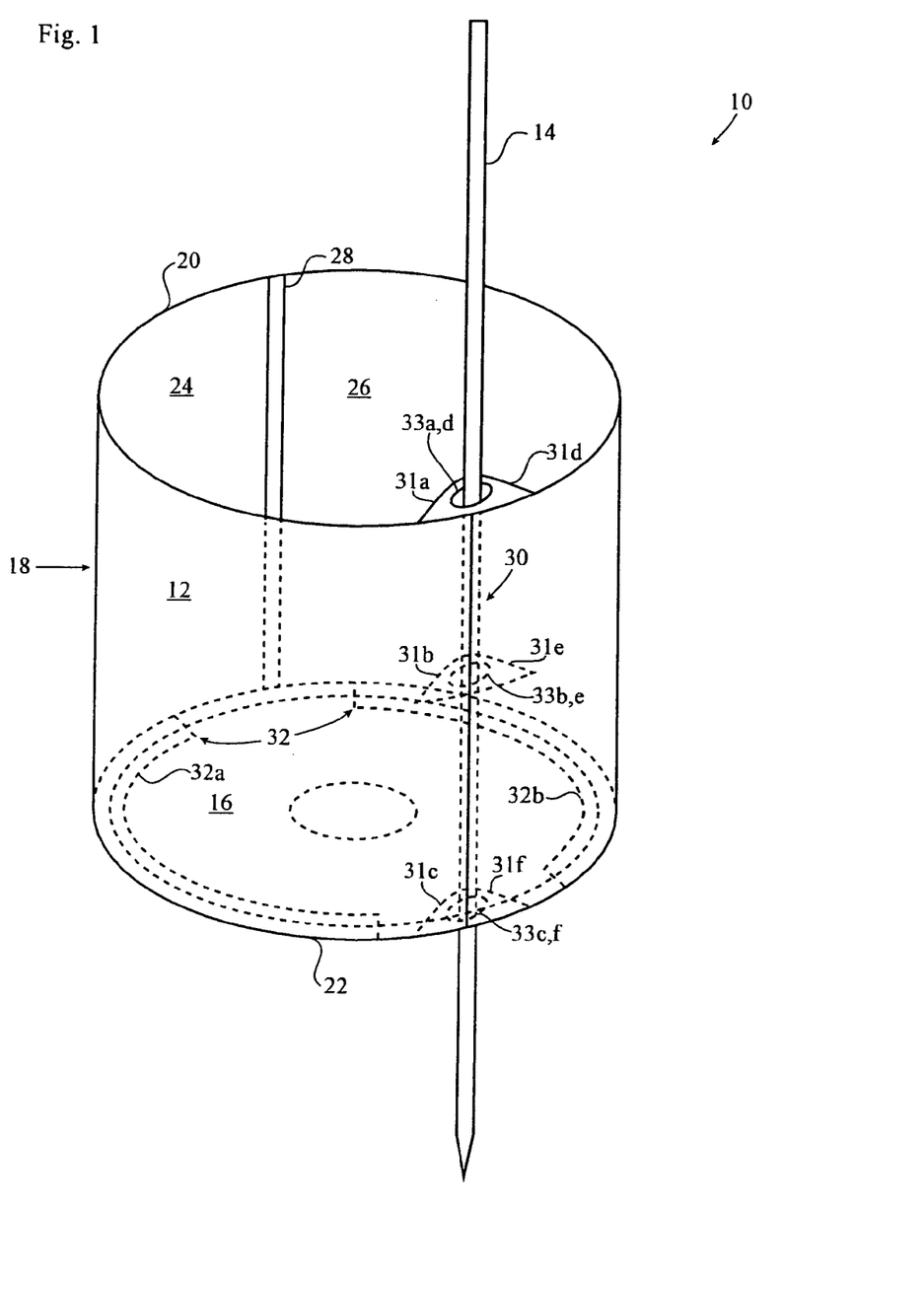
FIG. 1 diagrammatically illustrates aspects of a plant container assembly according to a disclosed embodiment.

An exemplary embodiment of a plant container assembly 10 is diagrammatically illustrated in FIG. 1, for example. Plant container assembly 10 may include, among other things, a plant container 12, a plant support 14, and a planar member 16. Plant container 12, which is illustrated in a generic and diagrammatic fashion, may be of any particular size, depending for example, on the size of plant for which it may be intended. In addition, plant container 12 may be of various geometric shapes. For example, while plant container 12 is illustrated in FIG. 1 as being generally cylindrical, it also may be frusto-conical in form and thereby circular in cross-section and having a bottom smaller than its top. It also may be formed with an oval cross-section or a polygonal cross-section, such as square, rectangular, triangular, hexagonal, octagonal, etc. In addition, plant container 12 may be formed in various free-form shapes.

Referring still to FIG. 1, plant container 12 may include, among other things, a sidewall 18, an open top 20, and an open bottom 22. FIG. 1 illustrates planar member 16 in place adjacent the open bottom 22, but as will subsequently be described, planar member 16 is selectively placed within plant container 12 to serve as a bottom, or selectively removed from plant container 12. Plant container 12 may be formed from a suitable plastic material. For example, plant container 12 may be formed from high density polyethylene polymer (HDPE), polyvinyl chloride (PVC), polyethylene terephthalate (PET) or a combination of polymers commonly employed in forming plant pots. The thickness and rigidity of plant container 12 may be varied, as desired, by varying the thickness and/or material of the plant container. It also is contemplated that plant container 12 may be formed of other materials such as wood, ceramics, metal, etc.

FIG. 1 illustrates certain aspects of sidewall 18 of plant container 12. Sidewall 18 may enclose an interior space capable of containing plant growing medium. Referring to FIG. 1, sidewall 18 may include a plurality of sidewall portions. The embodiment illustrated in FIG. 1 includes two sidewall portions 24 and 26, but it will be understood that sidewall 18 also may include three or more sidewall portions. Sidewall portions 24 and 26 may be connected to each other at a hinge member 28 permitting pivotal movement of the sidewall portions relative to each other. Sidewall portions 24 and 26 also may be selectively connected and secured to or disconnected from each other at a closure portion 30. Accordingly, sidewall portion 24 may be pivoted relative to sidewall portion 26 about hinge member 28 when their connection at closure portion 30 is released.

Plant container 12 also may include a ledge 32. Ledge 32 may be located adjacent open bottom 22 and may project inwardly toward the interior space enclosed by sidewall 18. Ledge 32 may be substantially continuous around the perimeter of plant container 12, or it may be discontinuous. Ledge 32 may comprise one or more ledge members on each of sidewall members 24 and 26, such as ledge member 32a and ledge member 32b illustrated in FIG. 1. Ledge 32 may serve to support planar member 16 when it is selectively inserted into plant container 12 to serve as a bottom member. As can readily been seen in FIGS. 1 and 4, ledge 32 and ledge members 24 and 26 also may be characterized as flange 32 and flange members 24 and 26.

Still referring to FIG. 1, hinge member 28 may be of various types. For example, hinge member 28 may be of the type characterized as a living hinge. Living hinges per se are well known and are commonly employed, for example, in plastic containers of various types, typically as a hinge connection between a container and a lid. Where plant container 12 is formed from plastic, for example, a living hinge may be formed between adjacent sidewall members 24 and 26 as a slightly thinner area of the plastic material of which sidewall 18 is formed. A living hinge is relatively simple to create during the process of container molding and may be continuous between open top 20 and open bottom 22, or it may extend only partially along sidewall 18. Alternatively, another type of hinge may be employed, for example where a material other than plastic forms the plant container 12. For example, hinge member 28 may be a piano hinge, two or more individual hinge elements spaced between the open top 20 and open bottom 22 of plant container 12, or any other type of hinge that will permit pivotal movement between sidewall members 24 and 26.

Closure portion 30 of plant container 12 also may be of various types. FIG. 1 illustrates one type of closure portion 30 that may conveniently be employed in connection with plant support 14. In the embodiment illustrated in FIG. 1, sidewall members 24 and 26 may be pivoted about hinge member 28 from an open position of plant container 12 to the closed position illustrated. In the closed position, plant support 14 may cooperate with closure portion 30 to ensure that sidewall members 24 and 26 may be maintained securely in a closed position.

Closure portion 30 may include a plurality of projecting members 31a-f in the embodiment illustrated in FIG. 1. It should be understood that the number of projecting members may vary, for example depending on the size of plant container 12. In the embodiment illustrated in FIG. 1, three projecting members 31a-c project from sidewall member 24, and three projecting members 31d-f project from sidewall member 26. Also in the embodiment illustrated in FIG. 1, all of the projecting members project inwardly toward the interior space enclosed by sidewall 18. It will be understood that this disclosure contemplates embodiments in which the projecting members may alternatively project outwardly of container 12.

Each projecting member 31a-f may include a corresponding aperture forming an eyelet 33a-f. The three projecting members 31a-c and their respective eyelets 33a-c are so positioned on sidewall member 24 so as to overlap the three projecting members 31d-f and their respective eyelets 33d-f on sidewall member 26 when sidewall members 24 and 26 have been pivoted about hinge member 28 to a closed position of plant container 12. Accordingly, only eyelets 33a-c are visible in FIG. 1, but the respective underlying eyelets are labeled (i.e., 33a,d, 33b,e, 33c,f). In the closed position, with eyelets 33a-c aligned with eyelets 33d-f, plant support 14 may be inserted through eyelets 33a-f and have the effect of securing the sidewall members 24 and 26 together thereby forming a closed plant container.

Figure 2A:
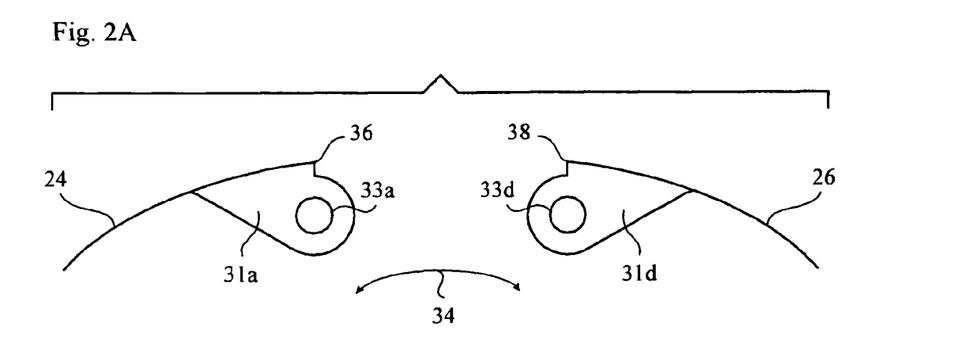
FIG. 2A is a diagrammatic detail illustrating aspects of a partially open plant container.
Figure 2B:
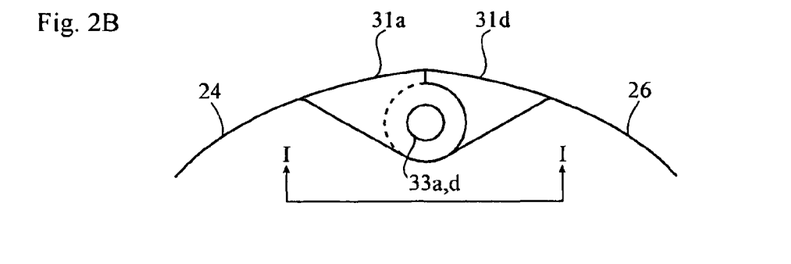
FIG. 2B is a diagrammatic detail illustrating aspects of a closed plant container.
Figure 2C:
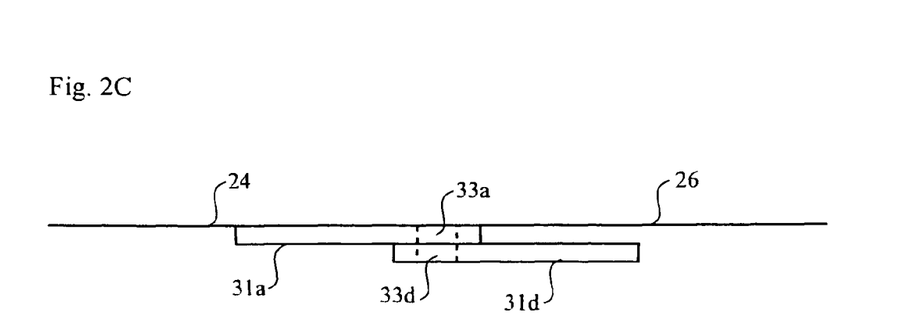
FIG. 2C is a detail view taken along the line I-I of FIG. 2B.

FIGS. 2A-2C are detailed illustrations of two of cooperating projecting members 31a-f, i.e., 31a and 31d. FIG. 2A is a plan view of a portion of sidewall members 24 and 26 of plant container 12 with the side wall members shown in a position in which they are partially pivoted to an open position of plant container 12. Arrow 34 designates the direction of movement as sidewall members 24 and 26 move from a closed position of plant container 12 to an open position. In the exemplary embodiment illustrated in FIG. 2A, projecting member 31a may be formed adjacent an edge 36 of sidewall member 24 and may project inwardly toward the interior space of plant container 12. In addition to projecting inwardly of plant container 12, projecting member 31a may project beyond edge 36 of sidewall member 24. Projecting member 31d on sidewall member 26, in a manner similar to projecting member 31a, projects inwardly from sidewall member 26 and beyond edge 38 of sidewall member 26.

Projecting member 31a includes an eyelet 33a and projecting member 31d includes an eyelet 33d. All of eyelets 33a-f are formed as an aperture through respective projecting members 31a-f, with the apertures being formed of sufficient dimensions to readily allow a plant support 14 (FIG. 1) to be inserted through the apertures. FIG. 2B illustrates projecting members 31a and 31d in an overlapping orientation as sidewall members 24 and 26 have been moved into a closed position of plant container 12. In the overlapped position shown in FIG. 2B, eyelets 33a and 33d may be aligned sufficiently to permit insertion of a plant support 14.

FIG. 2C is an edge view taken along line I-I of FIG. 2B and illustrates that projecting member 31d may be situated on sidewall member 26 so as to be positioned slightly lower than projecting member 31a so that projecting members 31a, 31d may be in an overlapping position with apertures 33a, 33d aligned when plant container 12 is in a closed position. As seen in FIG. 2C, projecting members 31a, 31d (as well as any other cooperating pairs of projecting members on the sidewall members) may fit closely against each other in a friction fit. The cooperating surfaces of the projecting members also may give some resistance to separation by reason of the friction fit. Of course it is contemplated that either of projecting members 31a and 31d could be lower or higher than the other.

As can be ascertained by viewing FIG. 1, for example, projecting members 31a and 31d may project from the upper perimeter of sidewall members 24 and 26. Similarly, projecting members 31c and 31f may project from the lower perimeter of sidewall members 24 and 26. As a result, eyelets 33a and 33d may be characterized as a first plurality of eyelets projecting from the upper perimeter of sidewall members 24 and 26, and eyelets 33c and 33f may be characterized as a second plurality of eyelets projecting from the lower perimeter of sidewall members 24 and 26. Projecting members 31b and 31e may project from a location intermediate projecting members 31a, 31d, and 31c, 31f. As a result, eyelets 33b and 33e may be characterized as a third plurality of eyelets projecting from a location intermediate the first and second plurality of eyelets.

Figure 3:
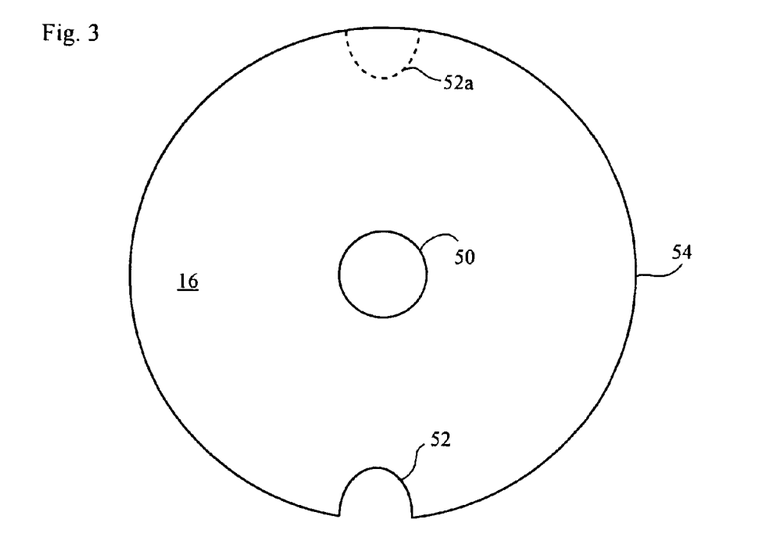
FIG. 3 is a diagrammatic illustration of a component of a plant container assembly.

FIG. 3 is an illustration of an exemplary planar member 16 that, selectively, may be employed as a bottom member for plant container 12. Planar member 16 may be formed dimensionally so as to rest near the bottom of plant container 12 on ledge members 32a, 32b forming ledge 32. In FIG. 3, planar member 16 is viewed in plan and is illustrated as a circular disc configured to fit within a circular plant container 12 having a circular cross-sectional shape. However, it will be understood that planar member 16 may be formed of any shape consistent with the cross-sectional shape of a plant container 12 with which it is associated. For example, if plant container 12 is square in cross-section, then planar member 16 also may be square. Planar member 16 may be formed of the same material that forms its associated plant container 12, or it may be formed of a different material. Similar to plant container 12, planar member 16 may be formed of any suitable material, such as synthetic polymers, wood, ceramics, metal, etc. Dimensionally, planar member 16 may be thin relative to its planar dimension.

Planar member 16 may include one or more apertures through its thickness dimension in order to permit drainage, for example, when planar member 16 has been inserted into a plant container 12 and serves as a bottom member. FIG. 3 illustrates a single aperture 50 through planar member 16 substantially at the center thereof, but it will be understood that aperture 50 may be situated anywhere on planar member 16, that there may be a plurality of apertures, or that there may be no apertures. Also illustrated in FIG. 3 is a notch 52 at an edge 54 of planar member 16. Notch 52 may be dimensioned such that, when planar member 16 is inserted into plant container 12 to serve as a bottom member, a plant support 14 inserted through eyelets 33*a-f* may be permitted to pass through notch 52 and into the ground.

Planar member 16 may include a single notch 52, or it may include one or more additional notches, either to ease the process of aligning a plant support with the notch, or to permit the use of plural plant supports in a given situation where plural plant supports may be necessary or desirable. For example, an additional notch 52*a* is illustrated in FIG. 3 in dotted lines at a position diametrically opposite notch 52. It will be understood, of course, that additional notches may be located at other positions as desired. As has been described above, planar member 16 may not necessarily be provided with an aperture 50 for drainage. In such a situation, notch 52 may operate to permit sufficient drainage since notch 52 may be sufficiently larger dimensionally than necessary to allow passage of a plant support 14.

Figure 4:
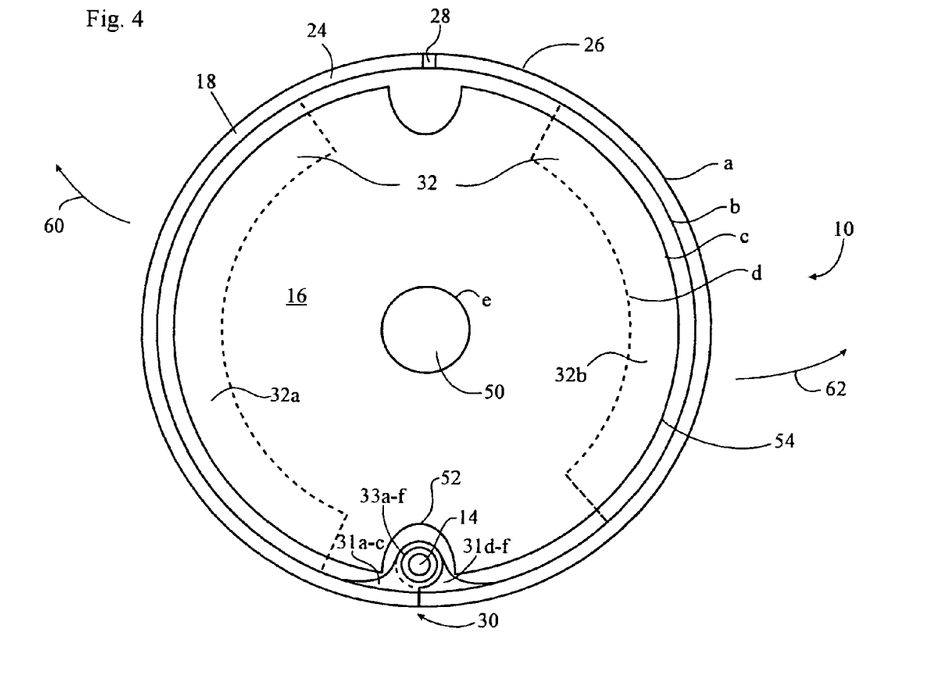
FIG. 4 is a plan view of aspects of a plant container assembly.

FIG. 4 is a diagrammatic illustration in plan of an exemplary plant container assembly 10 including plant container 12 with a planar support 16 inserted therein and with a plant support 14 securing sidewall 18 in a closed position. For illustrative purposes, the plant container assembly 10 is illustrated as including a plant container 12 that is cylindrical in form and therefore circular in cross-section, and a planar member 16 that is circular. Other forms for plant container 12 with different cross-sectional shapes for both plant container 12 and planar member 16 are contemplated.

In the exemplary embodiment illustrated in FIG. 4, five concentric circles labeled a-e (with circle d only being a partial circle) may be seen. The space between the two outer circles a and b schematically designates the thickness of sidewall 18 comprised of sidewall member 24 and sidewall member 26. Accordingly, the outer circle a in FIG. 4 represents the outer side of plant container 12 and the next circle b represents the inner side of plant container 12. Within circle b lies circle c representing the edge 54 of planar member 16. Circle d, in dotted lines, represents the inner edge of ledge 32 comprised of ledge member 32*a* and ledge member 32*b*. The innermost circle e represents an aperture 50 in planar member 16. Accordingly, it can readily be seen that planar member 16 may fit within plant container 12 and rest on ledge 32 to selectively form a bottom surface for plant container 12.

Still referring to FIG. 4, plant support 14 has been inserted through eyelets 33*a-f* located on projections 31*a-f* to thereby secure sidewall members 24 and 26 relative to each other and secure plant container 12 is a closed position. As can be seen, plant support 14 also passes through notch 52 on the edge 54 of planar member 16. In addition, ledge members 32*a* and 32*b* may be formed to stop short of closure portion 30 in order to permit passage of plant support 14 so that it may be inserted into the ground, if desired. In order to open plant container 12, for example to release it from any plant and growing medium that may be located therein, plant support 14 may be removed from eyelets 33*a-f* and sidewall members 24 and 26 may then be pivoted about hinge member 28 with sidewall member 24 moving in the direction of arrow 60 and sidewall member 26 moving in the direction of arrow 62.

Figure 5A:
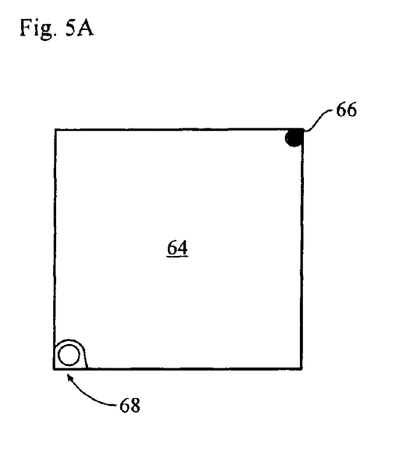
FIGS. 5A-5D are schematic illustrations in plan of various embodiments of a plant container according to the disclosure.

It is reiterated here that while an embodiment of a generally cylindrical plant container with curved sidewall portions has been describe and illustrated, other forms for the plant container are contemplated. For example FIGS. 5A, 5B, 5C, and 5D schematically illustrate other contemplated forms for a plant container that may have planar sidewall portions. FIG. 5A is a schematic plan of a plant container 64 having a square cross-section. Here, a hinge 66 may be included at one angle, as illustrated, and a closure portion 68 may be provided at another, for example opposite, angle. It also is contemplated that either or both of the hinge 66 and closure portion 68 alternatively may be located intermediate sides of the plant container 64.

Figure 5B:
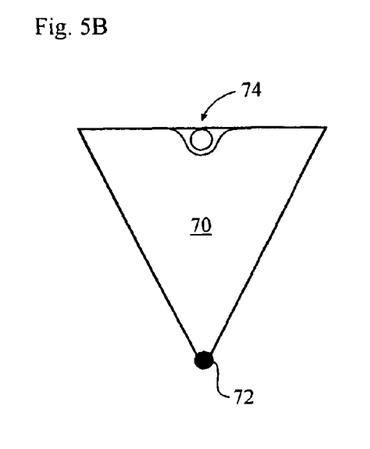
Figure 5C:
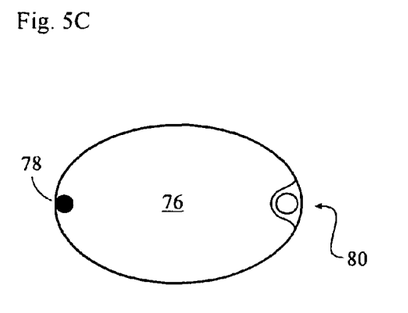

FIG. 5B is a schematic plan of a plant container 70 having a triangular cross-section. Here, a hinge 72 may be included at one angle and a closure portion 74 may be provided intermediate of the side opposite the hinge. It also is contemplated that hinge 72 could be located intermediate a side of the plant container 70 with closure portion 74 being located at an angle of plant container 70. In FIG. 5C, a plant container 76 having an oval cross-section is schematically illustrated. In this case, a hinge 78 may be provided at any desired location along the oval, and a closure portion 80 may be provided at another location along the oval, for example opposite the hinge as illustrated.

Figure 5D:
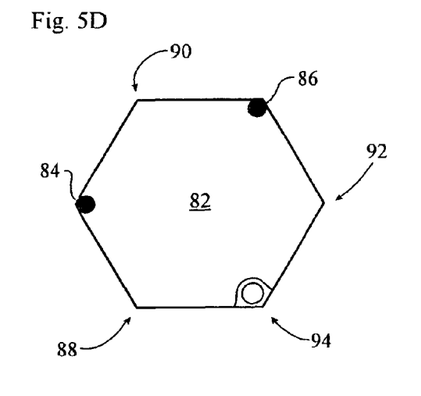

FIG. 5D illustrates, in schematic plan, a plant container 82 having a hexagonal cross-section. This embodiment illustrates a situation where multiple hinges 84 and 86 may be employed and multiple relatively moveable sidewall portions 88, 90, and 92 may result. For example, given that there are six angles involved, hinges may be located at any two of the angles, for example, and a closure portion 94 may be provided at another angle. As an alternative, it is contemplated that hinges 84 and 86 along with closure portion 94 could be located intermediate selected sides of plant container 82.

Figure 6:
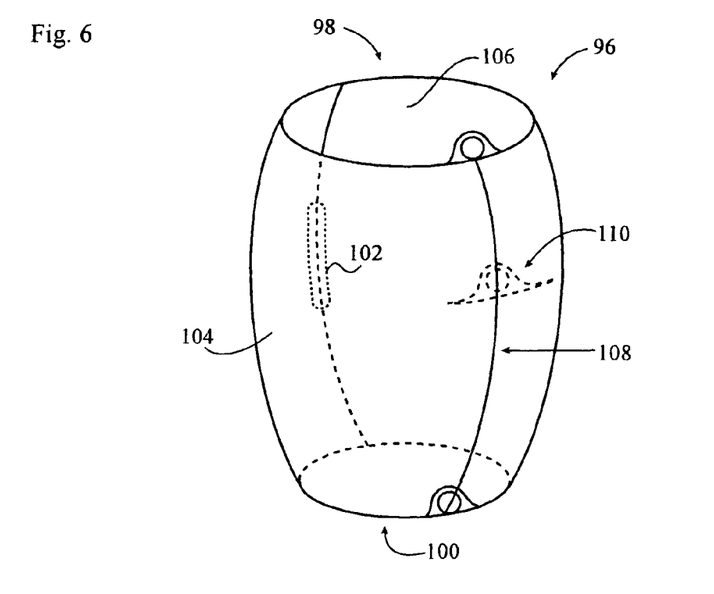
FIG. 6 is a diagrammatic illustration of yet another plant container embodiment according to the disclosure.

FIG. 6 schematically illustrates a further embodiment in side view. Here, plant container 96 may be more freeform or bulbous in shape. For example, as shown, open top 98 and open bottom 100 may be smaller than portions of plant container 96 between the open top and open bottom. Plainly, with such a shape, the process of removing plant container 96 from contained growing medium and plant may be greatly enhanced by the salient features of the disclosed embodiments. Whereas it may be very difficult to remove growing medium with a plant and root mass from such a container shape ordinarily, it could be accomplished with relative ease in a plant container including the disclosed hinge member and closure portion.

Still referring to the embodiment illustrated in FIG. 6, hinge 102 may be located between adjacent sidewall members 104 and 106, and may be located vertically of plant container 96 only at a portion of largest diameter, as shown generally, in order to prevent interference between sidewall portions during relative pivotal movement between an open and closed position of plant container 96. Where closure portion 108 is comprised of projecting members and eyelets, similar to the embodiment illustrated in FIG. 1, it is apparent that either plant support 14 may need to have sufficient flexibility to be inserted through eyelets that are not vertically aligned, or projecting members and eyelets may need to project to varying distances toward the interior space enclosed by plant container 96 so that the eyelets are substantially aligned. For example, in FIG. 6, the intermediate projecting members and eyelets (generally labeled 110 in FIG. 6, with all projecting members and eyelets essentially being similar to those disclosed in connection with FIG. 1) project toward the interior space of plant container 96 a distance sufficient to permit relative alignment with the upper and lower projecting members and eyelets. Alternatively, it may suffice to provide projecting members and eyelets only at portions of sidewall portions 104, 106 which correspond to each other in terms of plant container diameter. In a situation wherein eyelets are positioned so as not to be vertically aligned, plant support 14 (not shown in FIG. 6 but seen in FIG. 1, for example) may be formed from flexible metal wire or a suitable flexible plastic to facilitate the initial process of inserting the plant support through the unaligned eyelets.

Figure 7:
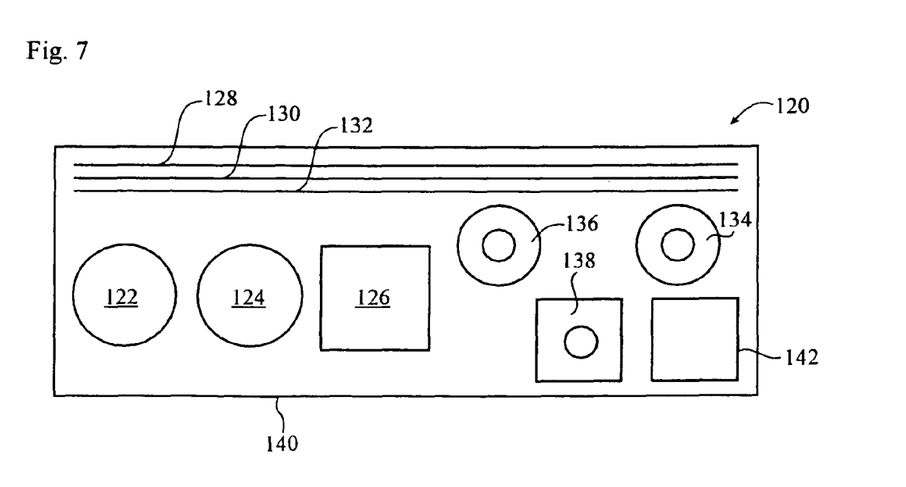
FIG. 7 is a schematic illustration of a kit according to the disclosure.

Referring to FIG. 7, plant container assembly 10 may be in kit form with components of the kit to be assembled as desired. Accordingly, kit 120 may include one or more plant containers 122, 124, 126, one or more plant supports 128, 130, 132, and one or more planar members 134, 136, 138. In the kit embodiment illustrated diagrammatically in FIG. 7, kit 120 may include three plant containers, three plant supports, and three planar members, but it is contemplated that any combination of plant containers, plant supports and planar members could be included. Providing a plurality of plant supports may offer the option to a user of the kit to provide additional support for some plants which may not be adequately supported with the use of a single plant support. Kit 120 may include a suitable container 140 made from cardboard, plastic, fabric, or any other suitable material, and capable of holding the kit components together. Instructions 142 for use may be included and may be printed or on CD or DVD.

Figure 8:
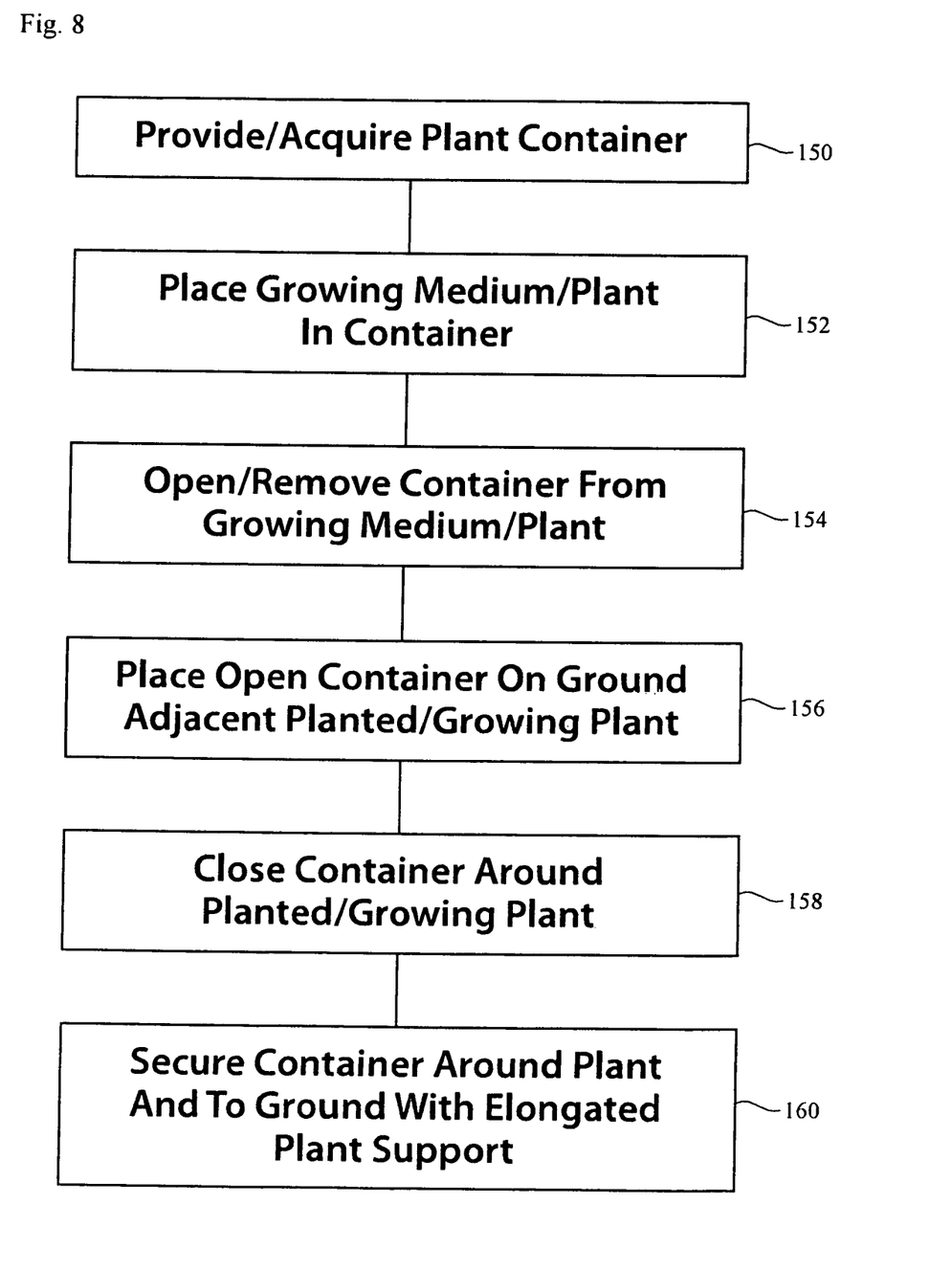
FIG. 8 is a flow diagram of a method according to the disclosure.

An embodiment employing the disclosed plant container assembly 10 in a method of selectively containing and protecting plants is illustrated in the flow diagram in FIG. 8. Initially, referring to box 150, a plant container 12 may be provided or acquired, the plant container 12 including an open top and an open bottom and wall portions hinged to each other along a hinge extending between the open top and open bottom, and secured to each other along a line extending between the open top and open bottom by a releasable fastener. In some embodiments, the releasable fastener may be comprised of the disclosed eyelets 33a-f coupled with the disclosed support 14.

Plant container 12 may be marketed or otherwise made available with a growing medium already within its interior space, or with both a growing medium and a particular plant within its interior space. As an alternative, plant container 12 may be marketed empty, either alone or in kit form as disclosed in connection with FIG. 7. In either event, a growing medium and a plant may be placed within plant container 12, as indicated in box 152. A user of the plant container 12 may then transport and/or store or display the plant container 12 and plant for a time until such time as it may be desirable to transplant the plant to the ground, for example in a garden or onto the landscape.

In order to transplant the plant in plant container 12, a user may open and remove plant container 12 from the growing medium and plant, as indicated in box 154. Here, features of plant container assembly 10 may enable removal of the plant container 12 to take place with facility and with very low risk of damage to the plant and its root mass. To remove plant container 12, the releasable fastener disclosed above may be released. According to a disclosed embodiment, this procedure may be accomplished by withdrawing a plant support 14 from its position of insertion through eyelets 33a-f, and then pivoting the sidewall members 24 and 26, for example, relative to each other about hinge member 28, for example, as described in connection with FIG. 1. Accordingly, the plant container 12 may now be in an open position, and the growing medium and plant have been separated from the plant container 12 with very low trauma to the plant.

The plant container, in an open position, subsequently may be placed on the ground and adjacent a planted and growing plant, as indicated in box 156. The growing plant typically may be the plant from which the plant container was removed as described in connection with box 154. Alternatively, the plant container may be placed adjacent another plant instead. In any event, the removed plant container may serve a purpose other than being a container for growing medium and a plant. Plants may need to be protected from mechanical damage, from pests such as insects, and from the elements such as too much sun and wind. Accordingly, the removed plant container may here serve the additional purpose of protecting a planted and growing plant.

Referring to box 158, the side wall portions 24, 26 may be pivoted about the hinge 28 and secured to each other by the releasable fastener at closure portion 30. Here, the open plant container is moved into a closed position by pivoting the sidewall portions about the hinge and bringing projecting members 31a-f and eyelets 33a-f into overlapped position as the plant container closes. The releasable fastener may be secured by inserting a plant support 14 through eyelets 33a-f. Referring to box 160, plant support 14, now securing the sidewall portions 24, 26 of plant container 12 to each other, may now be inserted into the ground to anchor the plant support and the plant container. Thus, any enclosed growing plant may now be protected from various sources of possible damage, and may be secured to plant support 14, by flexible ties or otherwise, when desired.

Practical Applicability

The disclosed embodiments of a plant container assembly may be employed to a number of advantages over existing plant containers. For those having ordinary skill in the art, the prior art process of removing a plant along with its growing medium and root mass from a plant container is familiar. Normally, the plant container is upended with the intent to gently release the growing medium and root mass from the plant container with one hand while the plant and growing medium are carefully held by the other hand. For very large plants with their heavy root balls, the plant container may even need to be cut away from the root ball. The embodiments of the present disclosure offer a different way of separating a plant container from its contents, and offer other advantageous features not present in conventional plant containers. The releasing of sidewall portions of the disclosed plant container at a portion of the container between its top and bottom for pivoting movement of the sidewall portions relative to each other offers a way to facilitate the removing of the plant container and its contents with little risk of damaging the plant.

The disclosed plant container assembly includes a plant support that serves multiple purposes. Initially, the plant support serves to secure the sidewall portions of the plant container to each other so as to hold the plant container in a closed position for receiving growing medium and a plant, and for releasing the sidewall portions and enabling pivoting movement relative to each other. Also, while the plant is in the plant container, for example for display, the plant support, while holding the plant container in a closed position, may serve to perform its supporting function for any contained plant which may need support. In addition, after the plant container has been removed from any contained growing medium and plant, the plant support may serve to anchor the plant container around a planted and growing plant to protect the plant from damage.

It is contemplated that the plant container may be decorative. In other words, referring to the embodiment of FIG. 1, for example, the exterior of plant container 12 may be colorfully or otherwise decorated with designs and patterns, depictions of plants, animals, or landscape scenes, various holiday scenes or images, or patriotic symbols, for example. Such decorations may be surface printings or relief patterns. Since many gardens and landscapes are provided with various inanimate decorations to enhance the uniqueness and beauty of a particular planting area, the disclosed embodiments lend themselves to this additional desideratum. Accordingly, when a decorative plant container is employed around a planted and growing plant, it may offer an additional level of distinctness to the planting area. It is contemplated that, in addition to its use for surrounding a growing plant for protection, the container may be used simply as a decorative addition to a planting area. For example, the container may be added to the planting area in an open position, anchored by two plant supports for example, one through a set of eyelets at each sidewall portion adjacent the closure portion.

It is contemplated that plant container 12 may be employed alone without plant support 14 or planar member 16. Alternatively, each of plant container 12, plant support 14, and planar member 16 may be used together. As a further alternative, the plant container may be used with the planar member only, or with the plant support only. Use of planar member 16 as a bottom for plant container 12 may be desirable when initially filling the plant container with growing medium, but may be removed when employing the plant container as a protective member for a growing plant or as a garden decoration. Since the planar member simply rests on a ledge adjacent the bottom of the plant container, the container sidewalls may be pivoted relative to the planar member with ease to leave the contained plant and growing medium sitting on the planar member convenient for transplanting.

To reiterate, plant container 12 may be formed from plastic, wood, metal, ceramics, glass, various composite materials, or any of myriad materials capable of serving to contain a plant with its growing medium. Planar member 16 may likewise be formed from any one of the materials listed for forming plant container 12 and may not necessarily be made from the same material as the plant container. Plant support 14 may likewise be made from any suitable material, such as plastic, wood, bamboo, metal, etc., and in situations where desired, may be formed with flexibility sufficient to allow insertion through eyelets that are not aligned. Plant support 14 may be circular in cross-section or it may be polygonal or oval in cross-section. Also plant support 14 may be much greater in length than in width or diameter.

While exemplary embodiments have been disclosed for a plant container, plant container assembly, kit, and method, other embodiments will be apparent to those having ordinary skill in the art from consideration of the specification and practice of the disclosed embodiments. Exemplary embodiments have been schematically illustrated, and the illustrations are not necessarily to scale. Some sizes may be exaggerated to aid illustration and accompanying description, as will be recognized by those having ordinary skill in the art. It is intended that the specification and examples be considered as exemplary only with the true scope of protection being indicated by the following claims.

I claim:

1. A method for selectively containing and protecting plants, comprising:
   providing a plant container including an open top and an open bottom and having first and second side wall portions hinged to each other along a hinge extending between the open top and open bottom and pivotally connecting the first and second sidewall portions for movement between an open position of the plant container, and a closed position of the plant container forming an interior space capable of containing plant growing medium, and including a flange member on each of the first and second sidewall portions adjacent the open bottom and projecting toward the interior space, and wherein the first and second side wall portions are releasably securable to each other along a line extending between the open top and open bottom at a closure portion including a first plurality of eyelets at an upper perimeter of the first and second sidewall portions and a second plurality of eyelets at a lower perimeter of the first and second sidewall portions;
   releasably securing the side wall portions to each other along the line extending between the open top and open bottom by inserting an elongated plant support through the plurality of eyelets on each of the first and second sidewall portions;
   placing growing medium and a plant within the plant container;
   removing the elongated plant support from the plurality of eyelets;
   pivoting the side wall portions about the hinge to open the plant container;
   removing the plant container from the growing medium and plant;
   placing the plant container on the ground and adjacent a planted and growing plant;
   pivoting the side wall portions about the hinge and securing the side wall portions to each other by inserting the elongated plant support through the first and second plurality of eyelets and into the ground.

2. A method for providing a decorative addition to a planting area, comprising:
   providing a plant container including an open top and an open bottom and having first and second side wall portions hinged to each other along a hinge extending between the open top and open bottom and pivotally connecting the first and second sidewall portions for movement between an open position of the plant container, and a closed position of the plant container forming an interior space capable of containing plant growing medium, and including a flange member on each of the first and second sidewall portions adjacent the open bottom and projecting toward the interior space, and wherein the first and second side wall portions are releasably securable to each other along a line extending between the open top and open bottom at a closure portion including a first plurality of eyelets at an upper perimeter of the first and second sidewall portions and a second plurality of eyelets at a lower perimeter of the first and second sidewall portions;
   releasably securing the side wall portions to each other along the line extending between the open top and open bottom by inserting an elongated plant support through the plurality of eyelets on each of the first and second sidewall portions;
   placing growing medium and a plant within the plant container;

removing the elongated plant support from the plurality of eyelets;

pivoting the side wall portions about the hinge to open the plant container;

removing the plant container from the growing medium and plant;

placing the plant container on the ground in the planting area and in an open position; and anchoring the open container in the open position with the elongated plant support inserted through eyelets of the first and second plurality of eyelets on the first sidewall portion and into the ground, and with an additional elongated plant support inserted through other eyelets of the first and second plurality of eyelets on the second sidewall portion and into the ground.

3. A plant container assembly comprising:

a sidewall including first and second sidewall portions;

an open top;

an open bottom;

a hinge member extending along the sidewall between the open top and the open bottom and pivotally connecting the first and second sidewall portions for movement between an open position of the plant container, and a closed position of the plant container forming an interior space capable of containing plant growing medium;

a flange member on each of the first and second sidewall portions adjacent the open bottom and projecting toward the interior space;

a closure portion extending along the sidewall between the open top and the open bottom, wherein the closure portion includes a first plurality of eyelets at an upper perimeter of the first and second sidewall portions and a second plurality of eyelets at a lower perimeter of the first and second sidewall portions; and a plant support extending through the first and second plurality of eyelets and selectively holding the plant container in the closed position.

4. The plant container assembly of claim 3, wherein a first end of the plant support extends below the bottom of the plant container, and a second end of the plant support extends above the top of the plant container.

5. The plant container assembly of claim 3, further including a third plurality of eyelets located intermediate the first and second plurality of eyelets.

6. The plant container assembly of claim 3, further including a planar member configured to be selectively placed within the plant container and supported on the flange member on each of the first and second sidewall portions to selectively form a bottom closure for the plant container.

7. The plant container assembly of claim 6, wherein the planar member includes at least one aperture through the planar member, and further includes at least one notch at an edge of the planar member.

8. The plant container assembly of claim 7, wherein the plant support further extends through the notch.

9. The plant container assembly of claim 8, further including growing medium within the plant container and a plant within the growing medium.

10. The plant container assembly of claim 3, wherein the hinge member is a living hinge.

11. The plant container of claim 3, wherein the open bottom is smaller than the open top.

12. The plant container of claim 3, wherein the sidewall portions are one of curved and planar in form.

13. The plant container of claim 3, wherein the open top and the open bottom have one of a circular, oval, and polygonal cross-sectional shape.

14. The plant container of claim 3, further including a third sidewall portion and second hinge member connecting the third sidewall portion to one of the first and second sidewall portions.

15. A kit for gardening and landscaping, comprising:

at least one plant container including a sidewall having first and second sidewall portions, an open top, an open bottom, a hinge member extending along the sidewall between the open top and the open bottom and pivotally connecting the first and second sidewall portions for movement between an open position of the plant container, and a closed position of the plant container forming an interior space capable of containing plant growing medium, a closure portion including a first plurality of eyelets at an upper perimeter of the first and second sidewall portions and a second plurality of eyelets at a lower perimeter of the first and second sidewall portions, and a flange member on each of the first and second sidewall portions adjacent the open bottom and projecting toward the interior space;

a plurality of elongated plant supports configured to extend through the first and second plurality of eyelets of the at least one plant container and having a length greater than the distance between the open top and the open bottom of the at least one plant container; and at least one planar member including at least one aperture through the planar member and at least one notch at an edge of the planar member, and configured to rest on the flange ledge members on each of the first and second sidewall portions.

* * * * *